N. H. SPENCER.
Churn Dasher.

No. 59,091. Patented Oct. 23, 1866.

WITNESSES:

INVENTOR.

UNITED STATES PATENT OFFICE.

N. H. SPENCER, OF CANANDAIGUA, NEW YORK.

IMPROVEMENT IN CHURN-DASHERS.

Specification forming part of Letters Patent No. 59,091, dated October 23, 1866.

*To all whom it may concern:*

Be it known that I, N. H. SPENCER, of Canandaigua, in the county of Ontario and State of New York, have invented a new and useful Improvement in Churn-Dashers; and I do hereby declare that the following is a full, clear, and exact description thereof, which will enable others skilled in the art to make and use the same, reference being had to the accompanying drawings, forming a part of this specification, in which—

Figure 1:
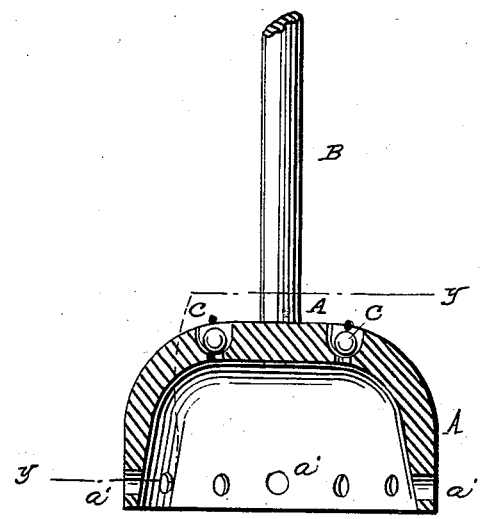
Figure 2:
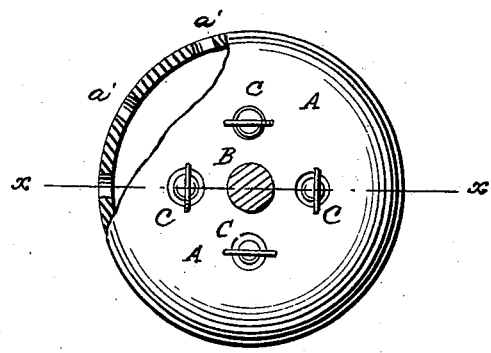

Figure 1 is a vertical section of my improved churn-dasher, taken through the line $x\ x$, Fig. 2. Fig. 2 is a detail sectional view of the same, taken through the line $y\ y$, Fig. 1.

Similar letters of reference indicate like parts.

My invention has for its object to furnish an improved churn-dasher, simple in construction, and which will bring the butter quick and of good quality; and it consists in making the dasher bowl-shaped, with horizontal holes through its sides around its lower edge, and with two or more valves in its upper part around the base of the dasher-handle, as hereinafter more fully described.

A is the dasher, which is turned out of a solid block of wood into the shape of a bowl, as shown in Fig. 1, the cavity being from three to five inches in depth. Around the sides of the dasher, a little above its lower edges, are formed horizontal holes $a'$, as shown in Figs. 1 and 2.

B is the dasher-handle, the lower end of which is securely attached to the central part of the upper part of the dasher A. Through the upper part of the dasher are formed two or more holes, the upper parts of which are countersunk or chambered out, so as to form cavities for the reception of the balls or marbles C, which form the valves. These balls or marbles C are kept in place by wires or staples passed across the upper parts of the holes, as shown in Figs. 1 and 2.

When only two valves are used, which will be sufficient for small dashers, they should be placed on opposite sides of the dasher-handle, and when more than two are used they should be arranged around the base of the dasher-handle B, as shown in Fig. 2.

In using the dasher, when it is forced down into the cream it carries the air with it, until the pressure of the cream causes the air to raise the balls or marbles C and escape through the cream into the upper part of the churn. As the dasher passes down lower into the churn the cream is forced upward through the valves, and it is also forced outward horizontally through the holes $a'$. When the dasher is raised the tendency is to form a vacuum in the upper part of the bowl-shaped cavity of the said dasher. The effect of this is to raise the cream with the dasher until the said dasher has been raised above the surface of the cream in the churn, when it flows out. The result is, that the cream is violently agitated, and at the same time thoroughly mingled with air, so that the butter is brought in a very short time, and is of very superior quality.

Having thus described my invention, I claim as new and desire to secure by Letters Patent—

1. Forming the dasher A in bowl shape, substantially as herein shown and described.

2. Forming two or more valves in the upper part of the bowl-shaped dasher A, substantially as herein shown and described, and for the purpose set forth.

3. The combination of two or more ball-valves C with the dasher A, substantially as herein shown and described.

N. H. SPENCER.

Witnesses:
OSCAR N. CRANE,
JOSEPH JAHN.